(12) United States Patent
Kim et al.

(10) Patent No.: US 7,486,171 B2
(45) Date of Patent: Feb. 3, 2009

(54) RFID TAG, SYSTEM FOR PURCHASING SERVICE BY USING RFID TAG, AND METHOD THEREOF

(75) Inventors: Hwan-joon Kim, Seoul (KR); Dae-youb Kim, Seoul (KR); Maeng-hee Sung, Seoul (KR); Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 11/353,969

(22) Filed: Feb. 15, 2006

(65) Prior Publication Data

US 2006/0261949 A1 Nov. 23, 2006

(30) Foreign Application Priority Data

May 23, 2005 (KR) .................. 10-2005-0043085

(51) Int. Cl.
*H04Q 5/22* (2006.01)
(52) U.S. Cl. .................. 340/10.1; 340/10.5; 340/572.1; 705/28
(58) Field of Classification Search ............. 340/572.1, 340/10.1, 10.5; 705/28
See application file for complete search history.

(56) References Cited

U.S. PATENT DOCUMENTS

| 6,169,483 | B1 * | 1/2001 | Ghaffari et al. ........... 340/572.3 |
| 7,138,915 | B2 * | 11/2006 | Morito et al. ............. 340/572.1 |
| 2002/0065680 | A1 * | 5/2002 | Kojima et al. .................. 705/1 |
| 2002/0186133 | A1 * | 12/2002 | Loof ........................ 340/572.1 |
| 2003/0135417 | A1 * | 7/2003 | Bodin ......................... 705/16 |
| 2004/0103034 | A1 * | 5/2004 | Reade et al. ................... 705/16 |
| 2005/0122209 | A1 * | 6/2005 | Black ......................... 340/5.52 |
| 2007/0001852 | A1 * | 1/2007 | Jalkanen et al. ........... 340/572.1 |

FOREIGN PATENT DOCUMENTS

| KR | 10-2004-0090169 A | 10/2004 |
| KR | 10-2005-0028097 A | 3/2005 |

* cited by examiner

*Primary Examiner*—George A Bugg
*Assistant Examiner*—Travis R Hunnings
(74) *Attorney, Agent, or Firm*—Sughrue Mion, PLLC

(57) ABSTRACT

An RFID tag used to purchase service related to the RFID tag containing purchase information, a service purchase system using the RFID tag, and a service purchase method thereof. The RFID tag provides content information, right information, and purchase information. Therefore, when purchasing service products such as contents, user convenience can be increased and reliability can be guaranteed.

23 Claims, 7 Drawing Sheets

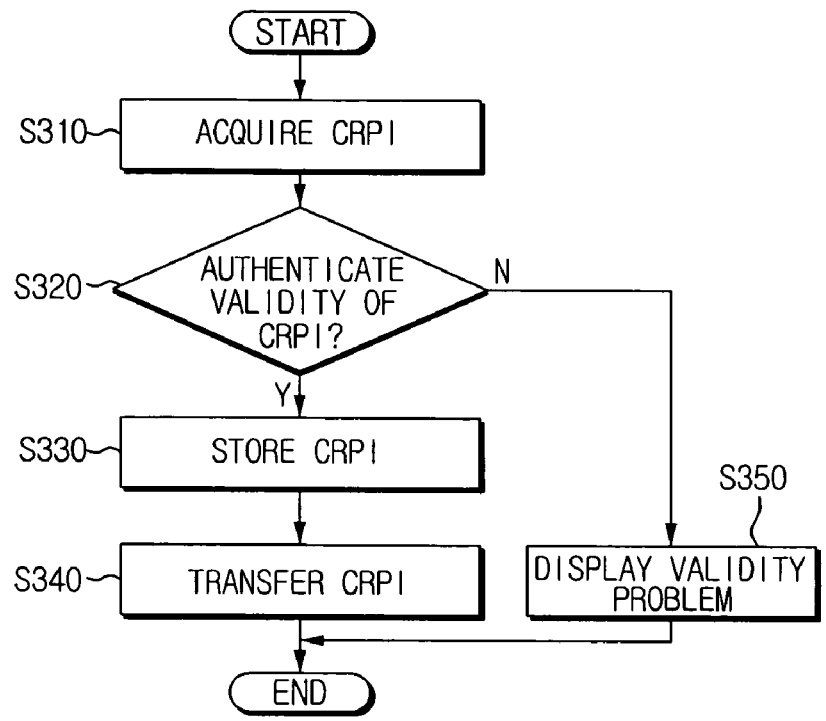
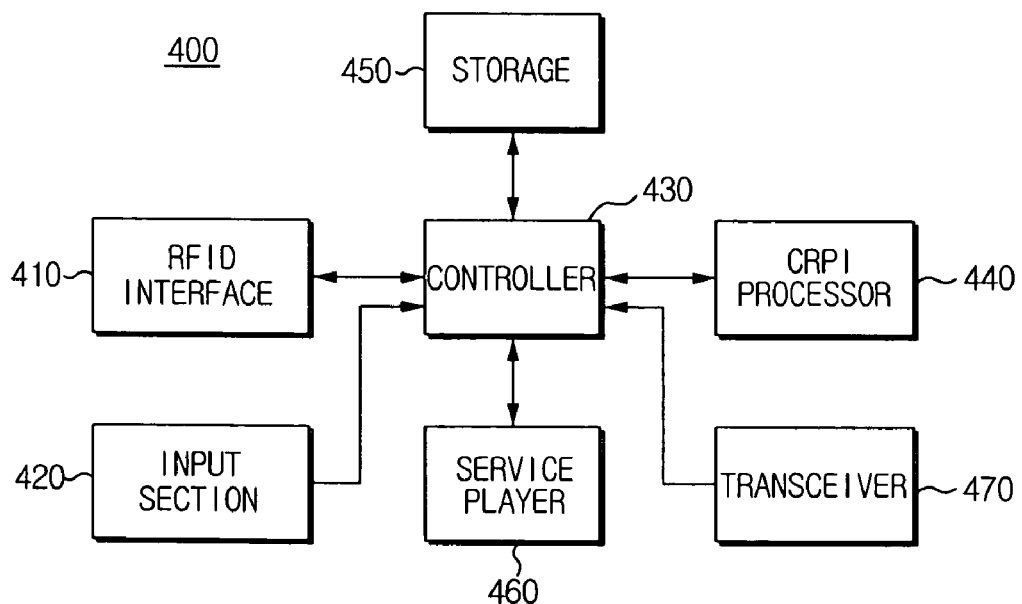

RFID TAG, SYSTEM FOR PURCHASING SERVICE BY USING RFID TAG, AND METHOD THEREOF

CROSS-REFERENCE TO RELATED APPLICATIONS

This application claims the benefit under 35 U.S.C. § 119 (a) from Korean Patent Application No. 2005-43085 filed on May 23, 2005 in the Korean Intellectual Property Office, the entire disclosure of which is incorporated herein by reference.

BACKGROUND OF THE INVENTION

1. Field of the Invention

Methods and apparatuses consistent with the present invention relate radio frequency identification (RFID) tags, systems for purchasing service using the RFID tags, and method thereof. More particularly, the present invention relates to an RFID tag used to purchase service in association with the RFID tag including purchase information, a service purchase system using an RFID tag, and a method thereof.

2. Description of the Related Art

RFID is a well-known technology to identify people or objects having a wireless tag within a short range of about 1 m without physical contact. Applications of the RFID include tagging pets and animals such as dogs, cows, and lambs, identifying people in a dangerous zone such as offshore drilling base, and tracking commercial products in retail and distribution phases. The RFID establishes a basic mechanism for simple interaction between a system and a person or a device.

Recently, an RFID tag operates in association with non-material contents as well as material products. A digital content reproduction system having the RFID processing system enables a purchaser to purchase paid service such as contents and movie tickets.

However, according to a conventional service purchase method using the RFID tag, the RFID tag does not provide content purchase information but provides only demo content information. Thus, a considerable communication time is taken to access a separate server by on-line for the content purchase and downloading, and an authentication function of the purchase information is not provided. Furthermore, a user has to determine whether to purchase the content or not shortly after the digital content reproduction system obtains the demo content information.

SUMMARY OF THE INVENTION

The present invention has been provided to address the above-mentioned and other aspects and disadvantages occurring in the conventional arrangement. The present invention provides a radio frequency identification (RFID) tag for enhancing facility of purchasing service products such as contents and ensuring reliability by providing content information, right information, and purchase information, a service purchase system using the RFID tag, and a method thereof.

According to an aspect of the present invention, there is provided a service purchase method which uses an RFID tag and is applied to a service purchase system including the RFID tag related to a service and an RFID reader, the method including acquiring service purchase information which is provided from the RFID tag; and authenticating validity of the service purchase information.

A service purchase method which uses an RFID tag and is applied to a service purchase system including the RFID tag related to a service and an RFID reader, includes acquiring service purchase information which is provided from the RFID tag; and obtaining a service corresponding to the service purchase information through a payment operation based on the service purchase information.

A service purchase method which is applied to a service purchase system using service purchase information which includes information for the service purchase, includes receiving the service purchase information; and obtaining a service corresponding to the service purchase information through a payment operation based on the service purchase information.

A service purchase system which uses an RFID tag and includes the RFID tag and an RFID reader, includes a transceiver; a storage which stores service purchase information; and a tag controller which transmits the service purchase information stored in the storage through the transceiver in response to a service purchase information request signal which is received from the RFID reader through the transceiver.

A service purchase system which uses an RFID tag and includes the RFID tag related to a service and an RFID reader, includes an RFID interface; a controller which acquires service purchase information provided from the RFID tag through the RFID interface; and a service purchase information processor which receives the service purchase information from the controller and authenticates a validity of the service purchase information.

A service purchase system which uses an RFID tag and includes the RFID tag related to a service and an RFID reader, includes a transceiver; an RFID interface; and a controller which acquires service purchase information provided from the RFID tag through the RFID interface, transmits payment information based on the service purchase information through the transceiver, and obtains a service according to the payment information through the transceiver.

BRIEF DESCRIPTION OF THE DRAWINGS

These and/or other aspects of the invention will become apparent and more readily appreciated from the following description of exemplary embodiments, taken in conjunction with the accompanying drawings of which:

FIG. 3 is a flowchart explaining a service purchase method using an RFID tag according to still another exemplary embodiment of the present invention;

FIG. 4 is a block diagram of a service purchase system using an RFID tag according to an exemplary embodiment of the present invention;

DETAILED DESCRIPTION OF THE EXEMPLARY EMBODIMENTS

Figure 1:
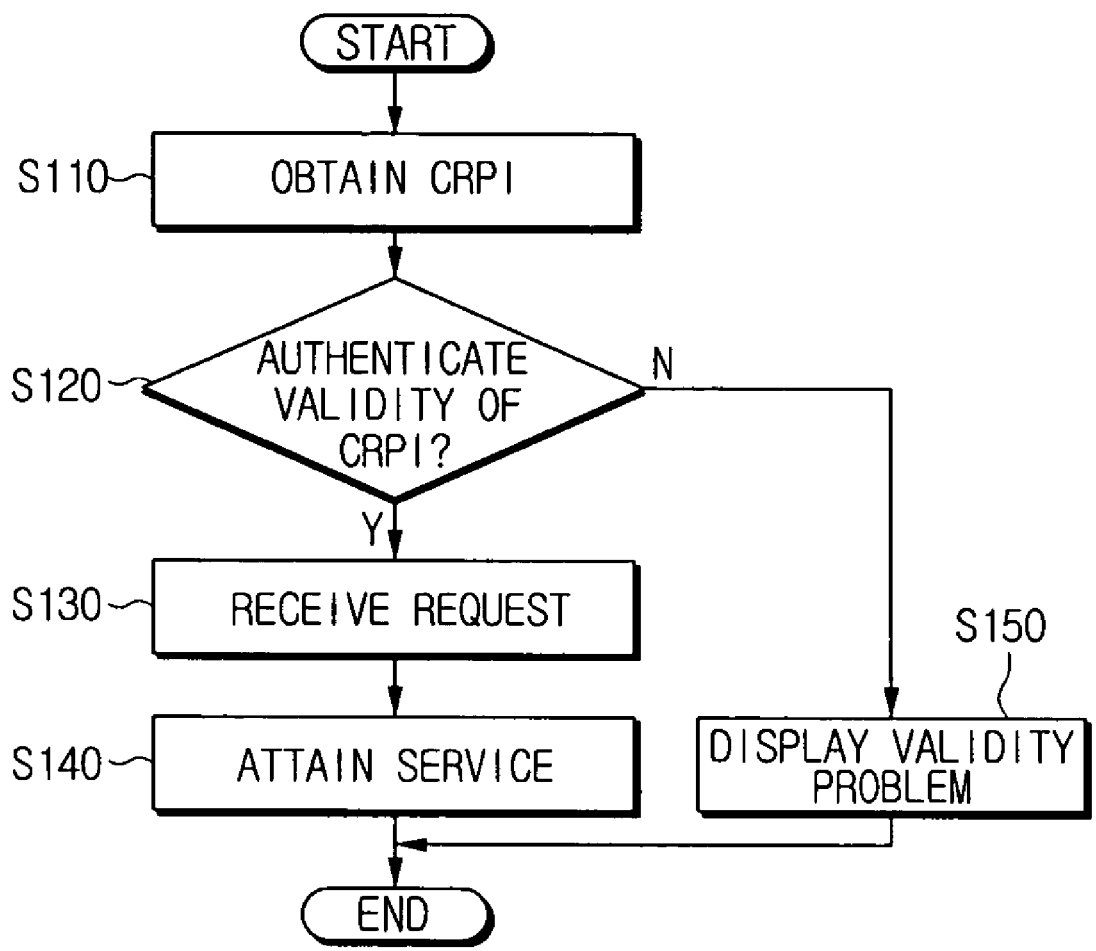
FIG. 1 is a flowchart explaining a service purchase method using an RFID tag according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 is a flowchart explaining a service purchase method using an RFID tag according to one embodiment of the present invention, which is described in detail.

First, an RFID reader obtains content, right, and purchase information (CRPI) which is service purchase information, from an RFID tag (S110). The RFID reader, which is a system providing a service purchase function using the RFID tag, represents devices capable of carrying an RFID processing function such as mobile phones, personal digital assistants (PDAs), and notebook computers. The CRPI may include, but is not limited to, CRPI_Global which is information relating to a CRPI processing module, Content_info which is content information, Right_info which is right information, and purchase_info which is purchase information.

The CRPI is now described in more detail.

The CRPI_Global can include CRPI_ver indicating a version of the CRPI (e.g., 1.0 version), CRPI_ID indicating an identifier defined by a writer of the CRPI, CRPI_valid_period indicating a valid period of the CRPI (e.g., Mar. 31, 2005), and CRPI_URL indicating an updated uniform resource locator (URL) of a CRPI processing module in relation with the valid period of the CRPI. The RFID reader compares its kept version of the CRPI processing module and the obtained version of the CRPI_ver. When the version of the CRPI processing module is lower than the obtained version, the latest version of the CRPI processing module can be downloaded from the updated URL (e.g., www.matrix.com/CRPI or a processing system for a higher version of the CRPI can be provided. When the valid period of the CRPI expires, which is defined by the CRPI writer, the CRPI processing module can be used to interrupt the processing of the CRPI even if the version of the CRPI processing module is higher than the version of the CRPI.

The Content_info of the CRPI can contain Content_ID indicating a content identifier defined by a content provider, Content_Class indicating a content class (e.g., movie, music, and music video), Content_Name indicating a content name (e.g., Matrix, Just one more time, and I loved you), and Content_specification indicating a content specification (e.g., run time 212 minutes, image size 640*288, audio type MP3, and frame rate 25 frame/sec).

The Right_info of the CRPI may contain Right_Class indicating a right class (e.g., play right and preview right), Right_Unit indicating a right unit cost (e.g., 100 dollars for one time and 500 dollars for 10 times), and a digital rights management (DRM) for managing the right (e.g. MS Media Player 9.0). At this time, it is preferable to check the processability of the DRM in advance.

The Puchase_info of the CRPI may contain Purchase_Method indicating a purchase method (e.g., credit card and mobile payment), Purchase_Auth indicating a purchase authentication (e.g. digital signature and none), Purchase_Invoice indicating a purchase invoice transfer method (e.g., e-mail, short message service (SMS), URL, and none), and a purchase URL (e.g., www.matrix.com/content). Note that the Purchase_Auth may differ from the Purchase_Invoice depending on the Purchase_Method.

Additionally, the CRPI includes CRPI_validity which is validity authentication information to authenticate contents such as the purchase method and the processing method. The CRPI_validity may include validation_method indicating a validation method to be used (e.g., public key infrastructure (PKI) and keyed-hash message authentication code (HMAC)), Validation_parameter indicating an authentication parameter such as a subject providing the authentication information, and Validation_value indicating a signature value for assuring of reliability of the entire CRPI.

Next, the RFID reader authenticates the validity of the CRPI obtained from the RFID tag (S120). The validity authentication method can use, but is not limited to, PKI and HMAC according to CRPI_validity. When the validity of the CRPI is not authenticated, the operation is ended. Among other operations that may be performed before the end of the authentication operation, the invalidity of the CRPI obtained from the RFID tag can be displayed (S150).

Next, the RFID reader receives a service purchase request from a user of the RFID reader (S130).

Next, the service is attained from the server through the payment operation (S140).

Figure 2:
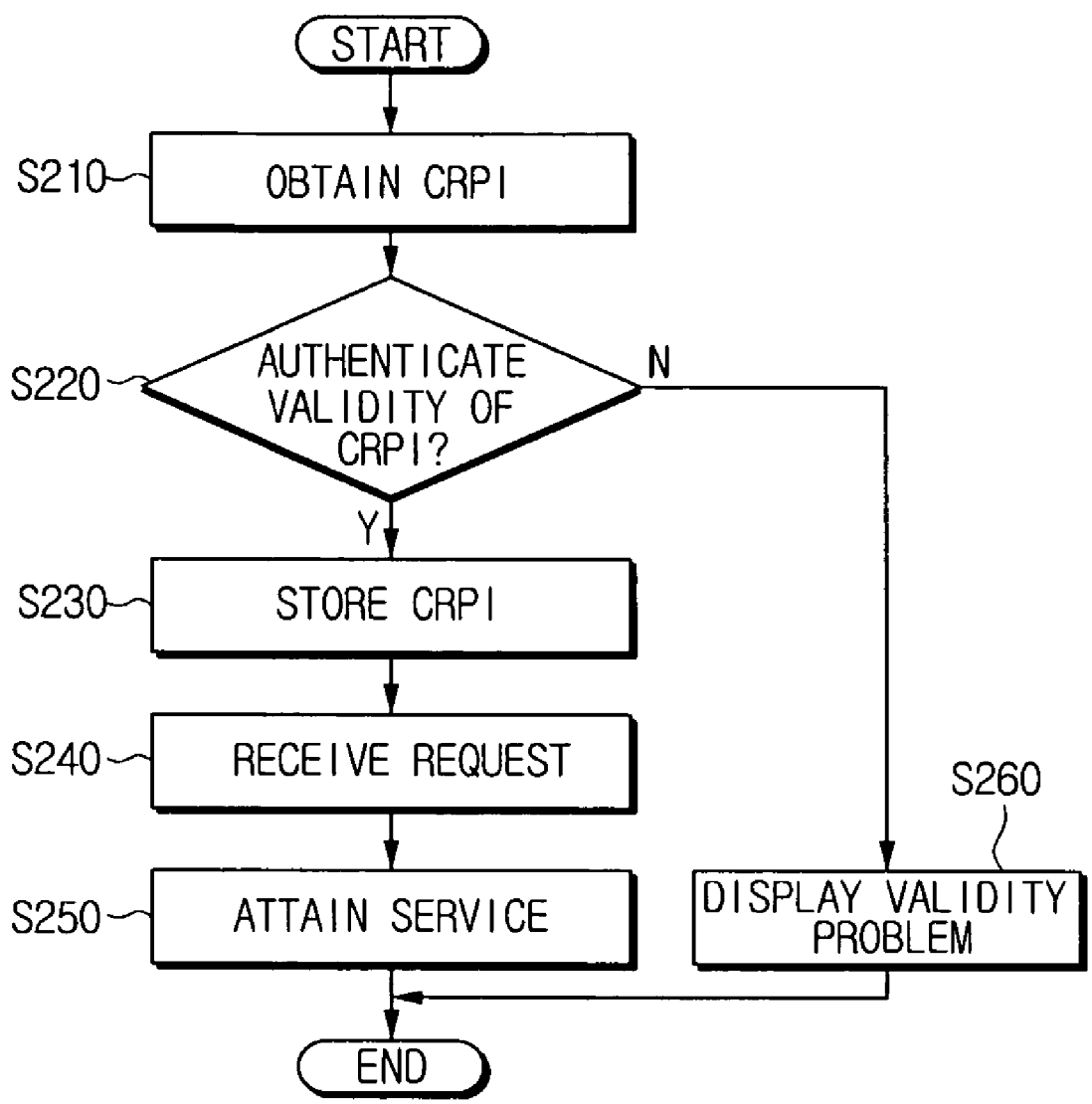
FIG. 2 is a flowchart explaining a service purchase method using an RFID tag according to another exemplary embodiment of the present invention.

FIG. 2 is a flowchart explaining a service purchase method using an RFID tag according to another exemplary embodiment of the present invention, which will be explained now.

The RFID reader acquires CRPI from the RFID tag (S210).

Next, the RFID reader authenticates validity of the CRPI acquired from the RFID reader (S220). When the validity of the CRPI is not authenticated, the operation is ended. Among other operations that may be performed before the end of the authentication operation, the invalidity of the CRPI acquired from the RFID tag can be displayed (S260).

The RFID reader stores the validated CRPI in its storage provided therein (S230). Note that the storing of the validated CRPI can include a temporary storing.

The RFID reader receives a service purchase request from a user of the RFID tag (S240).

Next, the service is attained from the server through the payment operation (S250). As the pre-stored CRPI is accessible all the time, the user of the RFID reader can adjust when to purchase the service at will.

FIG. 3 is a flowchart explaining a service purchase method using an RFID tag according to still another exemplary embodiment of the present invention, which will be explained below.

The RFID reader acquires CRPI from the RFID tag (S310).

Next, the RFID reader authenticates validity of the CRPI acquired from the RFID reader (S320). When the validity of the CRPI is not authenticated, the operation is ended. Among other operations that may be performed before the end of the authentication operation, the invalidity of the CRPI acquired from the RFID tag can be displayed (S350).

The RFID reader stores the validated CRPI in its storage provided therein (S330). Note that the storing of the validated CRPI can cover a temporary storing.

The RFID reader transfers the pre-stored validated CRPI to other devices (S340). The other devices represent not only devices capable of carrying the RFID processing function, such as mobile phones, PDAs, and notebook computers, but also devices capable of purchasing service in communication with the server without the RFID processing capacity, such as desk top computers having a communication function.

Among the other devices receiving the CRPI, a device connected to the server through a low-priced communication means, such as high-speed services for wired Internet, can acquire the service through the following procedure. It is to be understood that contents are employed by way of example of the service and the invention is not limited thereto.

A device, which intends to obtain the service, requests demo content data to the server using the CRPI. The demo content information is to request demo content data which is a part of the contents, so that the RFID reader can be provided with some of contents as a demonstration to determine whether to purchase the contents. Next, the server transfers the demo content data to the device according to the request. The device reproduces the received demo content data so that the user can determine whether to purchase the contents. When the user determines to purchase the contents, the device requests right and purchase information to the server. Conversely, when the user does not determine to purchase the contents, the operation is ended. Next, the device receives the right and purchase information from the server, and performs the payment operation based on the right and purchase information. As a result, the device can receive the intended contents from the service upon completing the payment operation. Even when the acquisition and the validation of the CRPI are conducted by a device which is connected to the server through a high-priced communication means such as cellular communication, and has a user interface means with low facility such as mini display and mini keypad, the communication cost for the service purchase and the service download can be reduced and the purchase procedure can be facilitated through the content purchase by transferring the CRPI to other devices which are connected to the server through a low-priced communication means, such as high-speed service for wired Internet, and have a user interface means with high facility, such as large scale monitor and keyboard.

Among the other devices receiving the CRPI, a device connected to the server through a high-priced communication means, such as cellular communication, can acquire the service through the following operation. Contents are used by way of example of the service and the invention is not limited thereto.

A device, which intends to acquire the service, determines whether the service purchase request by the pre-received CRPI is input. When the service purchase request is input, the device obtains the contents by performing the payment operation. When the service purchase request is not input, the operation is ended.

FIG. 4 is a block diagram of a service purchase system 400 using an RFID tag according to an exemplary embodiment of the present invention. The service purchase system 400 includes an RFID interface 410, an input section 420, a controller 430, a CRPI processor 440, a storage 450, a service player 460, and transceiver 470.

The RFID interface 410 receives a signal from the RFID tag under the control of the controller 430, or transmits a transmission request signal with respect to tag data stored in the RFID tag. To this end, the RFID interface 410 may be provided with an antenna, a modulation and demodulation circuit, and the like.

The input section 420 receives a command from the user and forwards the input command to the controller 430. The user can input various commands by pressing buttons provided on a portable device body or inputting a voice signal. For example, the user can input a reading command, a payment command, a service play command, and so forth, in relation to the RFID tag.

The controller 430, when the reading command is input through the input section 420, controls the RFID interface 410 to send a transmission request signal for the tag data stored in the RFID tag. When the tag data is the CRPI, the CRPI is provided to the CRPI processor 440. When the payment command is input through the input section 420, the controller 430 carries out the payment operation with respect to the service provided from the server via the transceiver 470, receives and processes the service data from the transceiver 470 so that the service player 460 can play the service, and outputs the processed service data to the service player 460. In addition, the controller 430 can fetch and drive the CRPI processing module from the storage 450.

The CRPI processor 440 is responsible to receive the CRPI from the controller 430, authenticate the validity of the CRPI by driving the CRPI processing module, and output the validated CRPI to the storage 450.

The storage 450 stores the validated CRPI received from the CRPI processor 440, provides the stored CRPI to the controller 430 under the control of the controller 430, stores the CRPI processing module, and updates the stored CRPI processing module under the control of the CRPI processor 440 or the controller 430.

The service player 460 receives and reproduces the service data, such as contents, processed by the controller 430 and outputs audio or video that the user can hear or view. Additionally, the service player 460 can display the validity problem to the user when the validity of the CRPI is in question.

The transceiver 470, under the control of the controller 430, provides the payment data to the service providing server according to the payment command, and forwards to the controller 430 the service data received from the service providing server.

Figure 5:
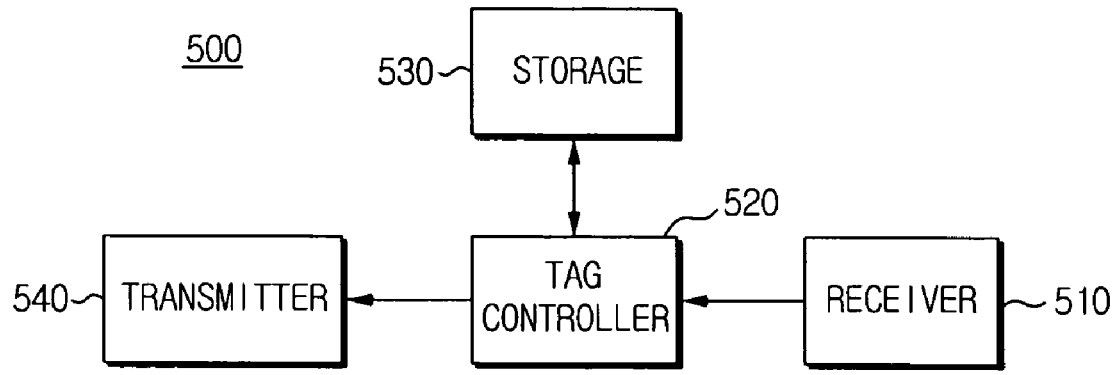
FIG. 5 is a block diagram of an RFID tag according to an exemplary embodiment of the present invention.

FIG. 5 is a block diagram of an RFID tag according to an exemplary embodiment of the present invention. The RFID tag 500 includes a receiver 510, a tag controller 520, a storage 530, and a transmitter 540.

The receiver 510 is responsible to receive a CRPI request signal from an external reader and provides the received signal to the tag controller 520. The receiver 510 can be realized by an antenna coil. In this case, upon receiving an electromagnetic wave from the external reader, the antenna coil can provide the received wave to the tag controller 520 by generating the induced current.

The tag controller 520, upon receiving the CRPI request signal through the receiver 510, forwards the CRPI provided from the storage 530 to the transmitter 540.

The storage 530 stores the CRPI and provides the stored CRPI to the tag controller 520 under the control of the tag controller 520. Detailed explanations on the CRPI have been provided earlier in reference to FIG. 1, and thus will not be discussed further for brevity.

The transmitter 540 receives the CRPI from the tag controller 520 and transmits the input CRPI to the external reader.

Figure 6:
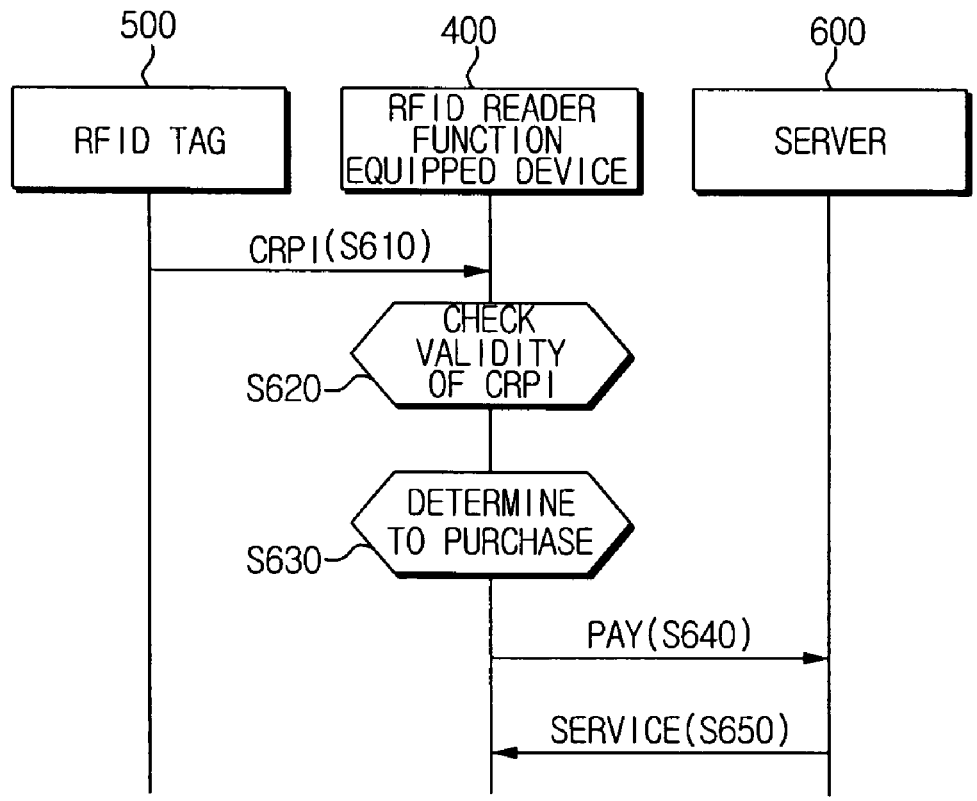
FIGS. 6 through 9 are signal flow diagrams illustrating the service purchase method using the RFID tag according to exemplary embodiments of the present invention.

FIG. 6 is a flowchart outlining the service purchase method using the RFID tag according to an exemplary embodiment of the present invention. The service purchase method is described with reference to FIG. 1 through FIG. 6.

According to a request from an RFID reader function equipped device 400 which is the service purchase system using the RFID tag, the RFID tag 500 transmits the CRPI to the RFID reader function equipped device 400 (S610).

The CRPI processor 440 of the RFID reader function equipped device 400 checks the validity of the CRPI (S620).

The controller 430 in the RFID reader function equipped device 400 determines whether the service purchase request is input from the user of the RFID reader through the input section 420 (S630).

When the service purchase request is input to the input section 420, the controller 430 performs the payment operation according to the CRPI and the user's selection and transmits the payment data to the server 600 (S640).

The server 600 receiving the payment data transmits the corresponding service to the RFID reader function equipped device 400 (S650).

Figure 7:
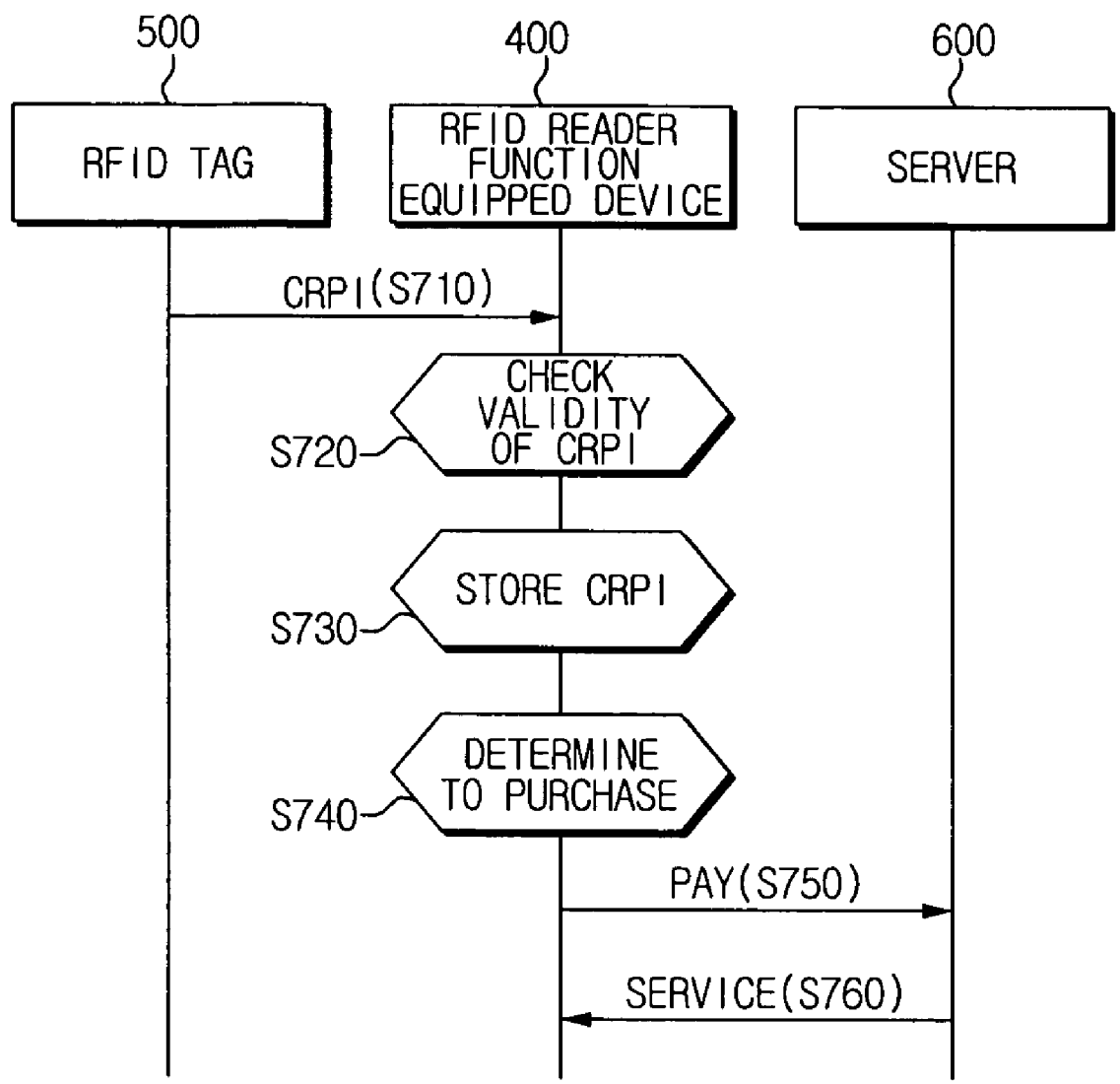

FIG. 7 is a flowchart outlining the service purchase method using the RFID tag according to an exemplary embodiment of the present invention, to be described with reference to FIG. 1 through FIG. 5 and FIG. 7.

The RFID tag 500 transmits the CRPI to the RFID reader function equipped device 400 in response to the request of the RFID reader function equipped device 400 which is the service purchase system using the RFID tag (S710).

The CRPI processor 440 of the RFID reader function equipped device 400 checks the validity of the CRPI (S720).

Next, the CRPI processor 440 stores the validated CRPI to the storage 450 of the RFID reader function equipped device 400 (S730).

The controller 430 of the RFID reader function equipped device 400 determines whether the service purchase request is input from the user of the RFID reader function equipped device 400 through the input section 420 (S740).

When the service purchase request is input to the input section 420, the controller 430 performs the payment operation according to the CRPI provided from the storage 450 and the user's selection and transmits the payment data to the server 600 (S750).

The server 600 receives the payment data and transmits the corresponding service to the RFID reader function equipped device 400 (S760).

Figure 8:
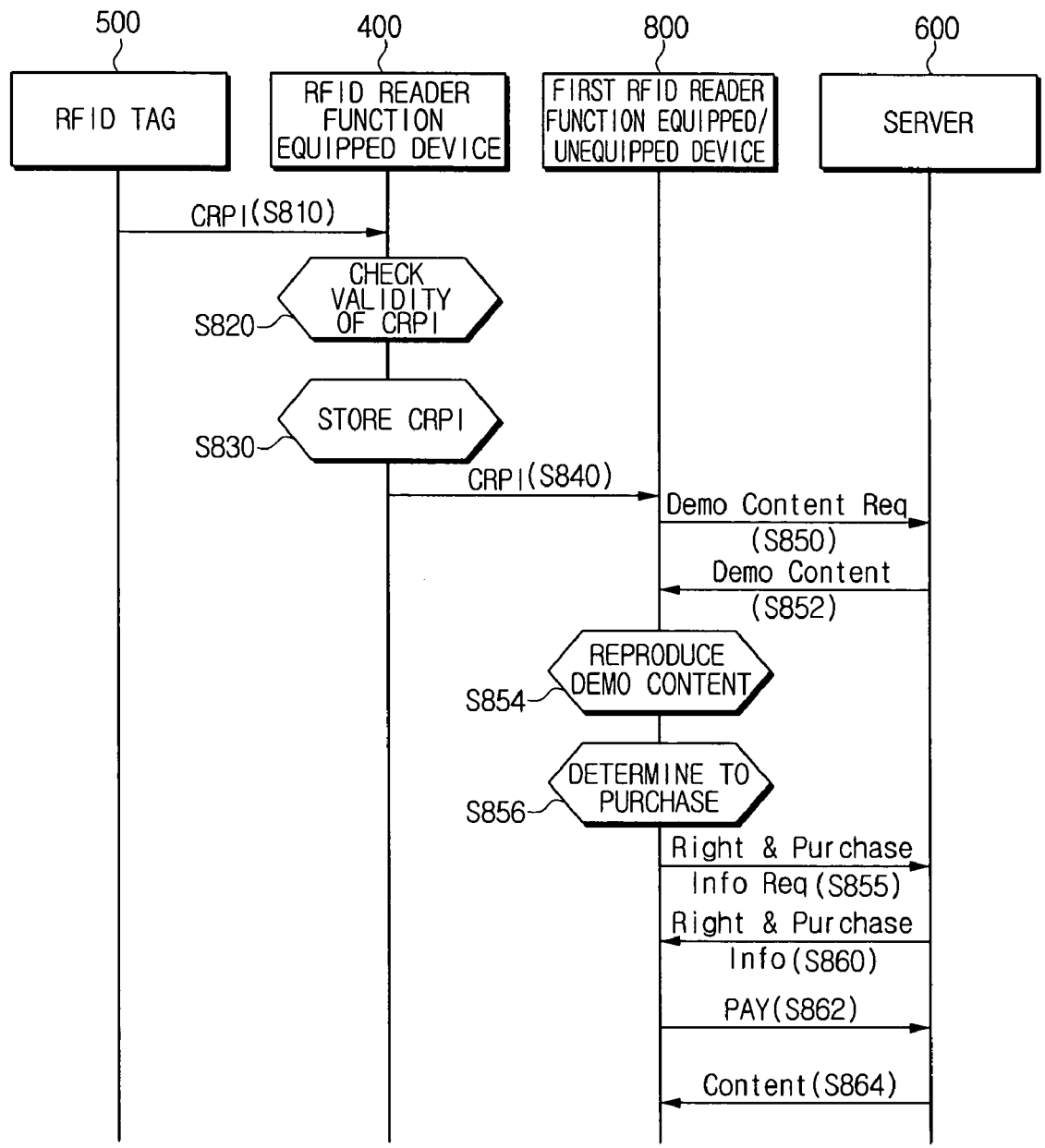

FIG. 8 is a flowchart outlining the service purchase method using the RFID tag according to an exemplary embodiment of the present invention, to be described with reference to FIG. 1 through FIG. 5 and FIG. 8.

The RFID reader function equipped device 400 acquires the CRPI from the RFID tag 500 via the RFID interface 410 (S810).

The CRPI processor 440 of the RFID reader function equipped device 400 checks the validity of the CRPI acquired from the RFID tag 500 (S820).

Next, the CRPI processor 440 stores the validated CRPI to the storage 450 provided therein (S830).

The RFID reader function equipped device 400 forwards the validated CRPI stored in the storage 450 to a first RFID reader function equipped/unequipped device 800 through the transceiver 470 (S840). The first RFID reader function equipped/unequipped device 800 is any device capable of communicating with the server 600 and purchasing the service without the RFID processing capacity, such as desktop computers having communication function, but not limited to this device. The first RFID reader function equipped/unequipped device 800 can be any device equipped with the RFID processing function, such as mobile phones, PDAs, and notebook computers. The first RFID reader function equipped/unequipped device 800 may be a device connected to the server 600 via a low-priced communication means such as high-speed services for wired Internet. Herein, contents are used by way of example of the service, for the understanding not for limitation. The service can include paid services such as movie tickets.

Next, upon receiving the CRPI, the first RFID reader function equipped/unequipped device 800 requests demo content data to the server 600 using the CRPI (S850).

The server 600 transmits the demo content data to the first RFID reader function equipped/unequipped device 800 in response to its request (S852).

The first RFID reader function equipped/unequipped device 800 reproduces the demo content data received from the server 600 using the service player 460 so that the user can determine whether to purchase the service (S854).

When the user determines to purchase the content (S856), the first RFID reader function equipped/unequipped device 800 requests right and purchase information to the server 600 (S858). Conversely, when the user determines not to purchase the content, the operation is ended.

The first RFID reader function equipped/unequipped device 800 receives the right and purchase information from the server 600 (S860) and conducts the payment operation in reference to the right and purchase information (S862).

Finally, the first RFID reader function equipped/unequipped device 800 receives the intended content from the server 600 upon completing the payment operation (S864).

Figure 9:
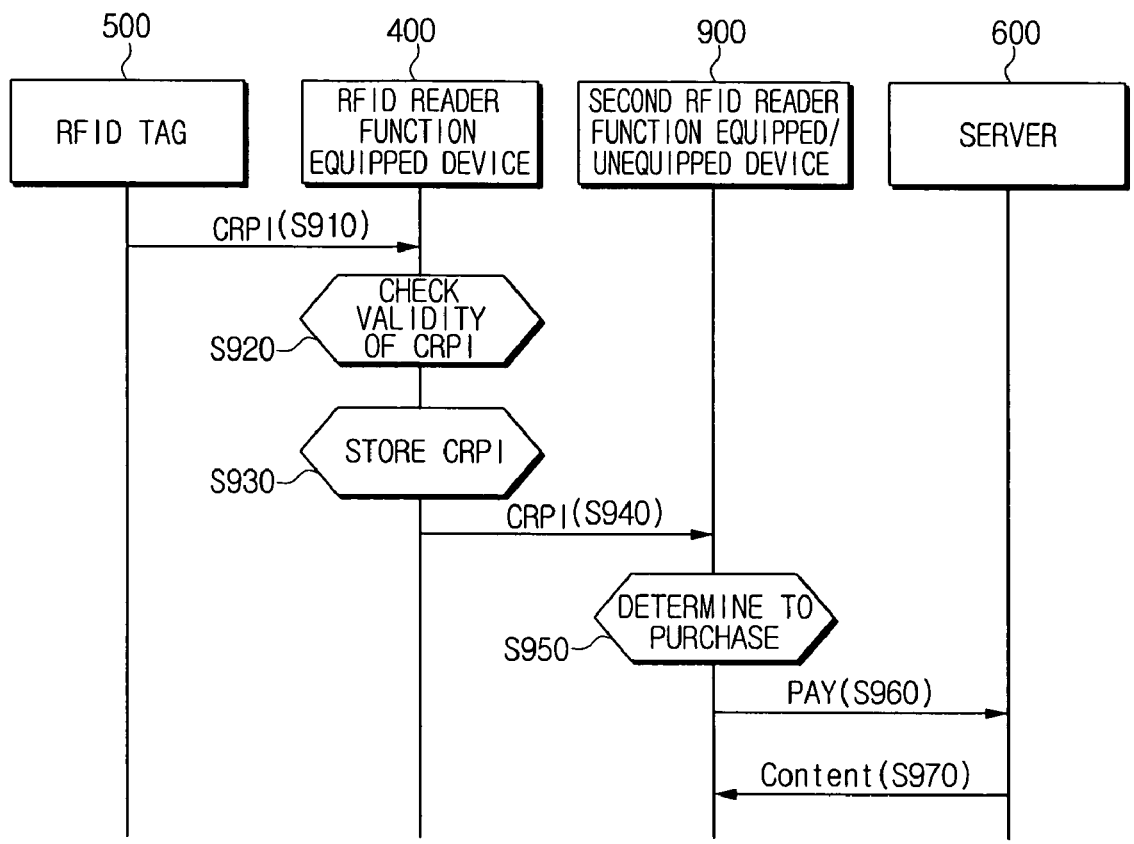

FIG. 9 is a flowchart outlining the service purchase method using the RFID tag according to an exemplary embodiment of the present invention, to be described with reference to FIG. 1 through FIG. 5 and FIG. 9.

The RFID reader function equipped device 400 acquires the CRPI from the RFID tag 500 through the RFID interface 410 (S910).

The CRPI processor 440 of the RFID reader function equipped device 400 checks the validity of the CRPI acquired from the RFID tag 500 (S920).

Next, the CRPI processor 440 stores the validated CRPI to the storage 450 provided therein (S930).

The RFID reader function equipped device 400 forwards the validated CRPI stored in the storage 450 to a second RFID reader function equipped/unequipped device 900 through the transceiver 470 (S940). The second RFID reader function equipped/unequipped device 900 is any device capable of communicating with the server 600 and purchasing the service without the RFID processing capacity, such as desktop computers having communication function, but not limited to this device. The second RFID reader function equipped/unequipped device 900 can be any device equipped with the RFID processing function, such as mobile phones, PDAs, and notebook computers. The second RFID reader function equipped/unequipped device 900 may be a device connected to the server 600 via a high-priced communication means such as cellular communication.

The user of the second RFID reader function equipped/unequipped device 900, which intends to obtain the service, determines whether to purchase the service based on the CRPI pre-received from the RFID reader function equipped device 400 (S950).

When the user determines to purchase the service, the second RFID reader function equipped/unequipped device 900 conducts the payment operation (S960) and acquire the content from the server 600 (S970). Conversely, when the user determines not to purchase the content, the operation is ended. It is to be appreciated that contents are employed by way of example of the service, for the understanding not for limitation. The service can include paid services such as movie tickets.

According to the present invention, the RFID tag, the service purchase system using the RFID tag, and the service purchase method validates the CRPI and utilizes the validated CRPI for the sake of the service purchase. Therefore, the service user can conveniently and securely purchase the service.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A service purchase method for a service purchase system including a radio frequency identification (RFID) tag related to a service and an RFID tag reader, the method comprising:
   acquiring service purchase information provided from the RFID tag; and
   authenticating validity of the service purchase information with the RFID tag reader,
   wherein said service purchase information comprises content, right and purchase information.

2. The service purchase method of claim 1, further comprising obtaining a service corresponding to the service purchase information through a payment operation based on the service purchase information.

3. The service purchase method of claim 1, further comprising storing the service purchase information which is validated.

4. The service purchase method of claim 3, further comprising providing the stored service purchase information.

5. The service purchase method of claim 3, further comprising obtaining a service corresponding to the service purchase information through a payment operation based on the stored service purchase information.

6. The service purchase method of claim 1, wherein the service purchase information includes at least one of information indicating service characteristics, information indicating a right of the service, information indicating a payment method, and authentication information assuring the validity of the service purchase information.

7. A service purchase method for a service purchase system including a radio frequency identification (RFID) tag related to a service and an RFID reader, the method comprising:
   acquiring service purchase information provided from the RFID tag; and
   obtaining a service corresponding to the service purchase information by accessing a server only once through a payment operation based on the service purchase information,
   wherein said service purchase information comprises content, right and purchase information.

8. The service purchase method of claim 7, wherein the service purchase information includes at least one of information indicating service characteristics, information indicating a right of the service, and information indicating a payment method.

9. A service purchase method for a service purchase system using service purchase information which includes information for the service purchase, the method comprising:
   receiving the service purchase information; and
   obtaining a service corresponding to the service purchase information by accessing a server only once through a payment operation based on the service purchase information,
   wherein said service purchase information comprises content, right and purchase information.

10. The service purchase method of claim 9, wherein the service purchase information includes at least one of information indicating service characteristics, information indicating a right of the service, and information indicating a payment method.

11. A service purchase system comprising:
    a transceiver;
    a storage which stores service purchase information; and
    a tag controller which transmits the service purchase information stored in the storage through the transceiver in response to a service purchase information request signal which is received from a radio frequency identification (RFID) tag reader through the transceiver,
    wherein the RFID tag reader receives and authorizes the validity of the service purchase information, and
    wherein said service purchase information comprises content, right and purchase information.

12. The service purchase system of claim 11, wherein the service purchase information includes at least one of information indicating service characteristics, information indicating a right of the service, and information indicating a payment method.

13. The service purchase system of claim 11, wherein the service purchase information includes authentication information which assures the validity of the service purchase information.

14. A service purchase system comprising:
    a radio frequency identification (RFID) tag related to a service; and
    an RFID tag reader, comprising:
      an RFID interface;
      a controller which acquires service purchase information provided from the RFID tag through the RFID interface; and
      a service purchase information processor which receives the service purchase information from the controller and authenticates validity of the service purchase information,
    wherein said service purchase information comprises content, right and purchase information.

15. The service purchase system of claim 14, further comprising a storage which stores the service purchase information validated by the service purchase information processor.

16. The service purchase system of claim 15, further comprising a transceiver through which the controller transmits the service purchase information stored in the storage.

17. The service purchase system of claim 14, wherein the service purchase information includes at least one of information indicating service characteristics, information indicating a right of the service, information indicating a payment method, and authentication information assuring the validity of the service purchase information.

18. A service purchase system comprising:
    a radio frequency identification (RFID) tag related to a service;
    a transceiver;
    an RFID interface; and
    a controller which acquires service purchase information provided from the RFID tag through the RFID interface, transmits payment information based on the service purchase information through the transceiver, and obtains a service according to the payment information by accessing a server only once through the transceiver,
    wherein said service purchase information comprises content, right and purchase information.

19. The service purchase system of claim 18, wherein the service purchase information includes at least one of information indicating service characteristics, information indicating a right of the service, and information indicating a payment method.

20. The service purchase system of claim 18, further comprising a service purchase information processor which receives the service purchase information from the controller and authenticates a validity of the service purchase information.

21. The service purchase system of claim 20, further comprising a storage which stores the service purchase information validated by the service purchase information processor.

22. The service purchase system of claim 21, wherein the controller transmits the service purchase information stored in the storage through the transceiver.

23. The service purchase system of claim 20, wherein the service purchase information includes authentication information which assures the validity of the service purchase information.

* * * * *